United States Patent Office 2,740,808
Patented Apr. 3, 1956

2,740,808

METHANE SULPHONIC ACIDS AND PRODUCTION THEREOF

Harry James Barber, Gidea Park, England, assignor to May & Baker Limited, Dagenham, Essex, England No Drawing. Application December 12, 1952, Serial No. 325,723

9 Claims. (Cl. 260—512)

This invention is for improvements in or relating to methane-sulphonic acids and derivatives thereof and has for its object to provide a new class of substituted methane sulphonic acids and derivatives thereof. The instant application is a continuation-in-part of application Serial No. 113,029 filed August 29, 1949, now abandoned.

These new compounds are the substituted methane-sulphonic acids of the general formula $R(O.CH_2.SO_3H)_n$ (in which $n$ is an integer not greater than 3 and R represents an unsubstituted aryl radical or an aryl radical substituted solely by one or more of halogen, alkyl, alkoxy, nitro, amino, cyano, carbalkoxy and carboxy), and the derivatives of these acids.

An important class of these new compounds is represented by the aryloxymethane sulphonic acids having the above general formula with $n$ equal to 1, and the derivatives of these acids. Members of this class (sodium salts are represented by Formula II) may be regarded as ethers of hydroxy-methane sulphonic acid, whose sodium salt I is more commonly known as sodium formaldehyde bisulphite, and whose structure was elucidated mainly through the work of Raschig:

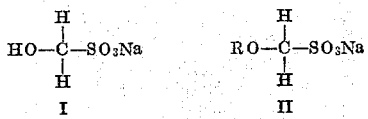

Attempts have been made to prepare the amides of this class by the action of chloromethanesulphonamide on sodium phenoxide (T. B. Johnson and Douglass, J. Amer. Chem. Soc. 1941, 63, 1571), but these attempts proved completely unsuccessful and these authors state that halogen in the α-position to a sulphonamide, sulphone or sulphonic acid group is very firmly bound and is very unreactive in metathetical reactions.

Despite the above statement, it has now been found that the new compounds of this invention may be obtained by the interaction of salt of a halo-methane sulphonic acid with a compound of the type $R(OM)_n$ where M represents an alkali metal ion, $n$ is an integer not greater than 3 and R represents a member of the class consisting of unsubstituted aryl radicals and aryl radicals substituted solely by at least one of the substituents halogen, alkyl, alkoxy, nitro, amino, cyano, carbalkoxy and carboxy.

In carrying the process of the invention into effect it is usually necessary to heat the reactants to a temperature of the order of 170° to 240° C., e. g. around 200° C., the practical minimum temperature in any particular case being that below which an adequate rate of reaction is not achieved while the practical maximum is that above which substantial decomposition of starting material or end product occurs. In many cases, it is convenient, as hereinafter exemplified, to employ an excess of the free phenolic compound as a reaction medium—this acting as a flux—and to recover the excess by methods suited to the particular compound in question. Such methods may consist of distillation, steam distillation or solvent extraction. The required sulphonic acid will normally be present as an alkali metal salt and such salts are usually soluble in water but insoluble in organic solvent. Thus, solvent extraction methods can conveniently be applied. By way of illustration with phenolic compound as flux, it may be convenient to remove most of the excess phenol by distillation and then to treat with alcohol, whereby any residual phenol will be retained in solution and the sodium salt will be thrown out of solution. Alternatively, after steam distillation or solvent extraction the sulphonic acid may be isolated as a less soluble salt, for example, barium salt, by addition of the appropriate cations. The free sulphonic acids are obtained by conventional methods, for example, by treatment of the barium salt with the stoichiometric proportion of sulphuric acid in hot aqueous solution, filtration from barium sulphate precipitate and evaporation of the filtrate. Free sulphonic acid is then obtained, usually as a syrup which slowly sets to a crystalline magma. The free acids have the typical properties of sulphonic acids in that they are highly soluble and frequently hygroscopic solids difficult to characterise other than by the conversion to stable salts such as are defined herein.

It will be understood that, according to the wide range of properties of the reactants and products dependent on the nature of the group R, many varied procedures for carrying out the reaction and for isolating the product may be employed. Thus if the phenol is high melting or is a poor solvent for the alkoxide or for other reasons does not form a satisfactory melt within the operating temperature range of about 170–240° C., the reaction may be carried out in the presence of water in a suitable pressure reactor. In such cases, the chloromethane sulphonate is generally preferable to the iodomethane sulphonate since with the latter there is a tendency for iodine to be liberated through side reactions and the free iodine may react with the other components and thereby produce undesirable by-products.

If a nitro substituent is required in the product, it is preferable to introduce this after the condensation, since the aryloxymethane sulphonic acids lend themselves to nitration. Similarly, a carboxy substituent can be obtained in the final product through oxidation of a nuclear methyl substituent by methods and reagents well known per se, for example, permanganate. Thus, 4-carboxyphenoxymethane sulphonic acid can be obtained either by condensing 4-hydroxy-benzoic acid (or an ester thereof) with the halomethane sulphonic acid, or by condensing p-cresol with the halomethane sulphonic acid and subsequently oxidising the product.

Experiments have shown that the stability of the group $-O.CH_2SO_3H$ in the new class of aryloxy methane sulphonic acids towards oxidising, reducing and hydrolytic reagents for example, is generally such that a wide range of reactions, in which nuclear substituent groups can be transformed by methods well known per se into other desired substituent groups, may be effected with these acids and their derivatives. Furthermore, by a suitable choice of the substituted hydroxy compound almost any desired oxy-methane sulphonate should be obtainable after an appropriate sequence of reactions.

The new aryloxy-methane sulphonates are useful intermediates for the preparation of aryloxy-methyl halides as described in co-pending application No. 113,030, now Patent No. 2,668,860, and have industrial application as surface active agents. Important sub-groups are the compounds containing as the radical R a phenyl radical substituted solely by at least one halogen atom, or at least one halogen atom and at least one alkyl or alkoxy group.

The present invention is illustrated by the following examples:

Example I 16 gms. of 2:4-dichlorophenol were heated to 120° C. and 2 gms. well-powdered sodium hydroxide were stirred in, followed by 14 gms. of sodium iodomethane sulphonate in powder form. A trace of copper bronze powder was also added. The temperature of the melt was raised gradually to 180° C. during which time a little water distilled out. Occasional stirring is advantageous. The temperature was maintained at 180–200° C. for 2 hours. The melt, after cooling somewhat, was poured into excess ethyl alcohol and the solid product filtered. It was freed from any remaining sodium iodide by dissolving in 25 ccs. of hot water, filtering to remove any copper, and adding 250 ccs. of ethyl alcohol. The product which crystallised on cooling and standing was filtered, washed with alcohol and dried. It was the sodium salt of 2:4-dichlorophenoxy-methane sulphonic acid. It had the following analysis: Na, 7.9; Cl, 25.5; S, 11.7%, the required figures being Na, 8.25; Cl, 25.4; S, 11.5%.

Example II

2:4-dichlorphenol (8.15 g.; 1.0 mol.), sodium hydroxide (2.0 g.; 1.0 mol.), iodo-methane sodium sulphonate (12.2 g.) and cupric acetate monohydrate (0.1 g.) were dissolved together in warm water (10 cc.) and heated at 200–220° C. for 16 hours in a sealed tube. The dark red brown reaction product was acidified to litmus by the addition of 2 N hydrochloric acid, diluted to 40 cc. and filtered whereupon unchanged 2:4-dichlorphenol was removed by ether extraction. The aqueous solution, after removal of ether, was heated and barium chloride dihydrate (6.1 g.) dissolved in boiling water (12 cc.) was added. On cooling, barium 2:4-dichlorphenoxymethane sulphonate separated in 57% yield.

Example III

A solution of sodium hydroxide (20 g.; 1 mol.) in warm water (30 cc.) was stirred carefully into molten 2:4-dichlorphenol (210 g.; 2.6 mol.). The water was removed by heating until the 2:4-dichlorphenol commenced to distil at a bath temperature of about 220° C. Iodo-methane sodium sulphonate (122 g.) was added at 160–180° C. and the semi-solid mass thoroughly mixed. A trace of copper bronze powder was then added, causing a slight exothermic reaction. On heating to 200–220° C. for 2 hours the melt first became fluid and then slowly solidified. After cooling the mass was broken up, and extracted with boiling ethyl alcohol (375 cc.) to remove sodium iodide and excess 2:4-dichlorphenol. The insoluble brown powder was dissolved in boiling water (200 cc.) treated with decolourising charcoal and filtered. After addition of barium chloride dihydrate (58 g.; 1 mol.) dissolved in the minimum of boiling water and cooling, the barium 2:4-dichlorphenoxymethane sulphonate (106 g.; 73%) was collected and washed with cold water (80 cc.). It was converted to sodium salt by solution in boiling water (2.2 l.) and treatment with sufficient sodium carbonate solution to precipitate completely the barium as carbonate. After filtration the sodium salt was obtained by evaporation of the solution to dryness. The S-benzyl-isothiouronium salt, obtained by adding S-benzylisothiourea hydrochloride to a solution of the sodium salt, had M. P. 135–136° C.

Example IV

The fusion procedure of Example 3 was repeated except that the iodomethane sodium sulphonate was introduced at the beginning, before removal of the water, and that fusion was continued for 4 instead of 2 hours. The melt was dissolved in boiling water (600 cc.) and acidified to litmus by the addition of hydrochloric acid. The excess 2:4-dichlorphenol was then removed by rapid steam distillation. On cooling, the liquor was decanted from the small quantity of black insoluble material, treated hot with decolourising charcoal and then filtered. Addition of barium chloride dihydrate (61 g.) dissolved in boiling water (200 cc.) and subsequent cooling, produced barium 2:4-dichlorphenoxymethane sulphonate in 75% yield.

Example V

The procedure of Example 3 was repeated except that fusion was continued for 4 instead of 2 hours and the copper bronze powder was omitted. The melt was treated by the method of Example 4 to give barium 2:4-dichlorphenoxymethane sulphonate in 89% yield. No water-insoluble, tarry by-product was formed under the conditions of this example.

Barium 2-chlorphenoxymethane sulphonate was also prepared from 2-chlorphenol by the above procedure in 78% yield. The S-benzylisothiouronium salt of the sulphonic acid melted at 158°.

Example VI

Sodium 4-chlorphenoxymethane sulphonate was prepared from 4-chlorphenol by the procedure of Example 3, except that only one molar proportion excess 4-chlorphenol was used as flux. Sodium iodide was removed from the reaction product by alcohol extraction, but the sodium 4-chlorphenoxymethane sulphonate was not further purified via its barium salt, as described in Example 3. The S-benzylisothiouronium salt of the sulphonic acid melted at 136–137° C. The product could be converted into 4-chlorphenoxymethyl chloride by the method of Example 8 of co-pending application No. 113,030, now Pat. No. 2,668,860.

Sodium 4-methoxyphenoxymethane sulphonate was also prepared from 4-methoxyphenol by the above procedure, the S-benzylisothiouronium salt having a melting point of 130–130.5° C. The product gave 4-methoxy-phenoxymethyl chloride by the method of Example 2 of the aforesaid co-pending application.

Sodium 4-methylphenoxymethane sulphonate was similarly prepared, the S-benzylisothiouronium salt melting at 127.5–128.5° C.

Example VII

Sodium 4-cyanophenate (2.8 g. containing 35% water; 1 mol.), sodium iodomethane sulphonate (4.9 g.; 1.5 mol.), 4-cyanophenol (2.4 g.; 1.5 mol.) and a trace of copper bronze powder were ground finely together in a mortar. On heating the mixture to 200–220° C. for 2 hours it first became fluid and then slowly thickened. The cold reaction product was powdered and extracted with boiling ethyl alcohol (50 cc.). The light brown, insoluble sodium 4-cyanophenoxymethane sulphonate was collected and dried at 95° C. The S-benzylisothiouronium salt of the sulphonic acid melted at 145–145.5° C. Applying the method of Example 9 of the aforesaid co-pending application the product was converted to 4-cyano-phenoxymethyl chloride.

Example VIII

Barium phenoxymethane sulphonate was prepared by the procedure of Example 3, omitting the final conversion to sodium salt. The S-benzylisothiouronium salt of the sulfonic acid melted at 102–103° C.

Example IX

Barium phenoxymethane sulphonate was prepared from phenol carrying out the fusion reaction by the method of Example 3 and isolating the product by the method of Example 4.

Example X

Crude sodium 4-bromphenoxymethane sulphonate pre- 4-bromphenol by the procedure of Example 3, except that the fusion reaction temperature was 170° C. instead of 200–220°, was separated from accompanying excess 4-bromphenol by ether extraction, and converted in aqueous solution into the S-benzylisothiouronium salt M. P. 139–140° C.

Example XI

A finely ground mixture of sodium 4-carbethoxyphenate (4.7 g.; 1 mol.), iodomethane sodium sulphonate (6.1 g.) and a trace of copper bronze powder was heated at 200–220° C. for 2 hours. The reaction product, sodium 4-carbethoxyphenoxymethane sulphonate, was isolated as described in Example 7. The S-benzylisothiouronium salt of the sulphonic acid melted at 165–166° C.

Example XII

A solution of potassium hydroxide (2.8 gm.; 1 mol.) in warm water (5. cc.) was stirred into molten 2:4-dichlorophenol (24.5 gm.; 3 mol.) at a temperature of about 100° C. The water was removed by heating until the 2:4-dichlorophenol commenced to distil. Potassium chloromethane sulphonate (8.43 gm.) together with a trace of copper bronze powder was stirred thoroughly into the melt at a temperature of 200° C. The mixture was heated for 3 hours at a temperature of 200–220° C.; on cooling, the solid was dissolved in water and the excess 2:4-dichlorophenol removed by ether extraction. The aqueous layer was treated with decolourising charcoal and filtered hot. On concentration of the filtrate to about 50 cc. and cooling in ice, the crystalline product was collected and dried at 95° C. to give potassium 2:4-dichlorophenoxymethane sulphonate (7.63 g.; 51%).

Example XIII

Sodium hydroxide (2 g.; 1.0 mol.) dissolved in warm water (2 cc.) was stirred into molten 2:4-dichlorphenol (35 g.; 4 mol.) and the mixture dried by removal of water by distillation. Bromomethane sodium sulphonate (9.9 g.) was added at 160° C. and the mixture rapidly melted by heating to 200–218° C. for 1 hour. The melt soon solidified. When cold it was dissolved in water (60 cc.) and the excess 2:4-dichlorphenol present removed by ether extraction. The aqueous solution was then treated at the boiling point with barium chloride dihydrate (12.2 g.) dissolved in hot water (35 cc.). On cooling barium 2:4-dichlorphenoxymethane sulphonate separated in 83% yield.

Example XIV

Chloroformic ester (6 cc.) was added to p-aminophenoxymethane sulphonic acid (10.2 g.) dissolved in sodium carbonate (10.6 g.) in water (100 cc.), at 25° C. The temperature rose to 40° C., and the mixture was stirred for 60 minutes and finally filtered. The filtrate was treated with dilute hydrochloric acid to destroy excess sodium carbonate and a hot solution of barium chloride dihydrate (5.7 g.) in water was added. The immediate precipitate was filtered off and the filtrate was evaporated until crystallisation of the required sodium salt occurred. This was converted to the barium salt by dissolving in hot water (50 cc.) and adding barium chloride dihydrate (5.5 g.) in boiling water (10 cc.). Immediate crystallisation set in resulting in plates which were crystallised from boiling water (200 cc.) to give slightly mauve lustrous plates of the barium salt of N-carbethoxy-p-aminophenoxymethane sulphonic acid.

Example XV p-Aminophenoxymethane sulphonic acid (5 g.) was diazotised below 15° C. by mixing with sodium nitrite (1.8 g.) in water (5 cc.) and adding to concentrated hydrochloric acid (5.6 cc.) mixed with ice (50 g.). A diazo solution containing β-naphthol (3.6 g.), sodium hydroxide (1 g.) in water (15 cc.) and sodium carbonate (0.75 g.) in water (5 cc.) was filtered and added at room temperature to the above solution. A scarlet precipitate was gradually formed, which was filtered off, washed and dried. The product was purified by dissolving in hot water, filtering and adding potassium acetate solution to precipitate the scarlet potassium salt. This was repeated twice and the dried powdered dye extracted with hot alcohol to remove potassium acetate yielding the potassium salt of 4-(β-naphtholazo)-phenoxymethane sulphonic acid.

Example XVI p-Aminophenoxymethane sulphonic acid (10.2 g.) was dissolved in ammonia (d. 0.880, 5 cc.) in water (20 cc.) and acetic anhydride (6.6 cc.) was added gradually. The mixture rapidly became hot and pasty and water (5 cc.) was added to enable stirring to continue. After 7 minutes the addition was complete and the mass was stirred for a further 25 minutes, cooled and the solid filtered off, washed with a very little ice-water and dried in a steam oven. It was purified by crystallisation from ethanol (75%, 80 cc.) with charcoal to give fawn coloured plates of the ammonium salt of p-acetylaminophenoxymethane sulphonic acid, M.P. 272–4° C.

Example XVII m-Chlorophenoxymethane sodium sulphonate (30 g.) was added with stirring to fuming nitric acid (60 cc.) at 3–6° C., over 50 minutes and stirring was continued for 10 minutes, the final temperature being 3° C. The dark coloured suspension was poured into water (20 cc.) and made neutral to Congo red with sodium hydroxide (25%, 170 cc.). The white solid which appeared was filtered. The aqueous liquors were neutralised to litmus, evaporated to ca. 150 cc. and the resulting crop of yellow crystals was filtered. The precipitate was extracted with boiling ethanol (90%, 100 cc.) to give a yellow solid which was twice recrystallised from ethanol (90%). This solid was dissolved in hot water (50 cc.) and on allowing to stand the sodium salt of 3-chloro-2-nitrophenoxymethane sulphonic acid crystallised as a pale cream solid. A further yield was obtained in the form of yellow microcrystals by evaporating the aqueous liquors to a bright yellow paste which was recrystallised from boiling water.

Example XVIII

Hydroquinone monomethyl ether (12.4 g.) was melted at 80° C., sodium hydroxide pellets (2 g.) were added and the temperature was increased to 160° C. An exothermic reaction then occurred and the temperature rose to 180° C. Sodium iodomethane-sulphonate (12.2 g.) was added at intervals at 140–170° C. As much water as possible was removed and copper bronze added. The ingredients were well mixed, heated to 200–220° C. and maintained at this temperature for 2 hours. The resulting solid was ground in a mortar, refluxed for 1 hour with ethanol (50 cc.) and left to stand overnight. After cooling in ice the mixture was filtered and washed with a small amount of cold alcohol and acetone. The solid was ground up and dried in a steam oven at 95° C. for 3–4 hours. The sodium salt of p-methoxyphenoxymethane sulphonic acid was obtained as a pale buff solid.

Example XIX

Sodium pentachlorophenate (14.5 g.) was mixed with sodium chloromethane sulphonate (81%, 10.6 g.) and treated with water (10 cc.) for better mixing. The water was then boiled off on a bath held at 130° C. The temperature was then increased to 230–240° C. and the contents maintained at 200–220° C. for 4 hours. The solid was then treated with water (175 cc.) and the solution made acid to Congo red with concentrated hydrochloric acid (5 cc.). The mixture was cooled in ice and the solid formed collected, washed with water, alcohol and ether and dried to yield the sodium salt of pentachloro-phenoxymethane sulphonic acid as a pale buff solid.

Example XX p-Aminophenoxymethane sulphonic acid (1 g.) was suspended in glacial acetic acid (5 cc.), treated with bromine (0.8 g.) in glacial acetic acid (5 cc.) at 40–45° C. over 10 minutes and allowed to stand at this temperature for 30 minutes more. The mixture was then heated to 95° C. for 5 minutes, cooled and filtered. The product recrystallised from boiling water as slightly mauve tinted crystals of mono-bromo-p-aminophenoxymethane sulphonic acid.

*Example XXI*

Sodium chloromethane sulphonate monohydrate (17 g.), resorcinol (5.5 g.) and sodium hydroxide (4.0 g.) were dissolved in hot water (20 cc.) and the solution heated in a sealed tube at 220–230° C. for 16–17 hours. The contents of the tube were boiled with water (50 cc.) to give a dark red solution containing some insoluble material which was filtered hot through a Hyflo pad and the filtrate acidified to Congo red with hydrochloric acid. The solution was again filtered and the filtrate shaken with ether. The aqueous layer was treated with barium chloride dihydrate (12.2 g.) in water (25 cc.). On standing a heavy crystalline precipitate separated and the supernatant liquor which contained a gelatinous material was decanted off. The decanted liquor was boiled and filtered and the filtrate concentrated to a small bulk. The yellow crystals which precipitated were filtered off and recrystallised from hot water as the barium salt of phenylene-1:3-bisoxymethylsulphonic acid.

*Example XXII*

2:5-dichlorphenol (5.0 g.; 3.0 mol.) was converted to sodium salt with sodium hydroxide (0.44 g.; 1.1 mol.) and reacted with iodomethane sodium sulphonate (2.44 g.) by the fusion procedure of Example 5. The product was isolated by dissolving the melt in water (90 cc.) making the solution acid to litmus by the addition of hydrochloric acid and extracting the excess 2:5-dichlorphenol with ether. Barium chloride dihydrate (1.2 g.) dissolved in hot water was added to the hot aqueous layer diluted finally to 130 cc. The barium 2:5-dichlorphenoxymethane sulphonate which separated on cooling in 72% yield was dried at 95° C.

Barium 2:4:5-trichlorphenoxymethane sulphonate was also prepared by the above method, the corresponding S-benzylisothiouronium salt melting at 112–114° C. Barium 2:4:6-trichlorphenoxymethane sulphonate was similarly prepared by the above method, the corresponding S-benzylisothiouronium salt melting at 115–116° C.

*Example XXIII*

2:4-dichlorphenol (16.3 g.; 1.0 mol.) sodium hydroxide (4 g.; 1.0 mol.) and chlormethane sodium sulphonate (17.0 g.) were dissolved in hot water (17 cc.) and heated at 220–230° C. for 16 hours in a sealed tube. The reaction mixture was dissolved in water (150 cc.) and the solution acidified to Congo red with concentrated hydrochloric acid. Unchanged 2:4-dichlorphenol was removed by ether extraction and the aqueous layer then treated with barium chloride dihydrate (12.2 g.) dissolved in boiling water (30 cc.). Barium 2:4-dichlorphenoxymethane sulphonate crystallised out in 70% yield on cooling.

*Example XXIV*

A solution of sodium hydroxide (16 g.; 1.1 mol.) in warm water (25 cc.) was stirred carefully into molten m-chlorophenol (200 g.; 4.3 mol.) and the mixture dried by distilling off the water. Chloromethane sodium sulphonate monohydrate (61 g.) was mixed in at 160° C. and the melt heated at 180–205° C. for 2.5 hours. A small amount of water distilled out during the first few minutes and the melt set solid after heating for about one hour. The solid was dissolved in water (600 cc.) and the solution made acid to litmus by the addition of hydrochloric acid. The excess m-chlorophenol was extracted into ether and the aqueous layer treated at the boiling point with barium chloride dihydrate (45 g.) dissolved in water (100 cc.). The barium salt which crystallised on cooling was converted into the corresponding sodium salt by conventional means. On cooling the concentrated aqueous solution, sodium 3-chlorophenoxy methane sulphonate crystallised in 93% yield.

*Example XXV*

Barium 2:6-dichlorophenoxymethane sulphonate was prepared by the method of Example XXII, except that 5 molar proportions of 2:6-dichlorophenol were used in the fusion reaction and the aqueous extract was evaporated to about 15 cc. before being treated with barium chloride dihydrate (1.2 gms.) in hot water (3 cc.).

*Example XXVI*

50% w./v. sodium hydroxide solution (8.5 cc.) was added to molten 3-methyl-4-chlorophenol (24.85 g.) and the water distilled off. Iodomethane sodium sulphonate (23.4 g.) was mixed in and the whole heated at 200–220° C. internal temperature for four hours. The reaction mixture was taken up in boiling water and the sodium 3-methyl-4-chlorophenoxymethane sulphonate which separated on cooling was collected and purified by washing successively with ether and cold water. Yield 63%. A further 18% yield was obtained as barium 3-methyl-4-chlorophenoxymethane sulphonate by treating the mother liquor with barium chloride.

*Example XXVII*

3:5-dimethyl-4-chlorophenol (156.5 g.) melted at 160°, 50% w./v. sodium hydroxide solution (29.1 cc.) was added and the water distilled off. Technical (85%) chloromethane sodium sulphonate monohydrate (67.0 g.) was mixed in and the whole heated at 200–220° C. internal temperature for four hours.

The reaction mixture was triturated with ether (400 cc.) and the residue dissolved in boiling water (600 cc.) and made acid to Congo red by addition of hydrochloric acid. The solution was extracted thoroughly with ether, treated with charcoal and Hyflo Supercel and filtered. A solution of barium chloride dihydrate (44 g.) in boiling water (90 cc.) was added to the filtrate which was then cooled to 10° C. The solid was filtered off, washed with water and dried, giving barium 3:5-dimethyl-4-chlorophenoxymethane sulphonate in 90% yield.

*Example XXVIII*

A solution of sodium hydroxide (2.0 g.; 1.0 mol.) in a little water was added to molten octylphenol (20.6 g.; 2.0 mol.) and the water removed by distillation. Iodomethane sodium sulphonate (12.2 g.) was stirred in and the reaction mixture heated at 180–200° for 2 hours. The melt was dissolved in ethyl alcohol (150 cc.), treated with a little Hyflo Supercel and the solution filtered. On cooling, a 65% yield of sodium octylphenoxymethane sulphonate separated.

*Example XXIX*

Powdered sodium phenoxymethane sulphonate (350 g.) was added with stirring to concentrated nitric acid (500 cc., d.=1.45) at 33–37° C. over a period of 105 minutes, and the thick pasty mixture was stirred for a further 30 minutes at this temperature. The suspension was diluted by pouring into cold water (1.5 l.) and was then neutralized to Congo red with 25% sodium hydroxide solution (750 cc.), and cooled in ice. Sodium 4-nitrophenoxymethane sulphonate crystallized as a buff coloured solid, and a second crop was obtained by concentrating the liquors after neutralization to litmus to a volume of about 1 litre.

*Example XXX*

Sodium 4-nitrophenoxymethane sulphonate from Example XXIX (20 g.) dissolved in water (150 cc.) was treated with gaseous hydrogen in the presence of 2% $PtO_2$ catalyst at 65° C. and 5 atmosphere pressure. After removing the catalyst by filtration, the filtrate and washings (ca. 400 cc.) were distilled under reduced pressure until the bulk of the solution was considerably reduced (ca. 100 cc.) when concentrated HCl was added until the mixture was acid to Congo red. On cooling, the free 4-aminophenoxymethane sulphonic acid crystallised in light brown needles in 85% yield.

Example XXXI

The neutralised aqueous liquors from Example XXIX were evaporated until crystals began to form, when the whole mass was cooled in ice. The resulting sodium 2-nitrophenoxymethane sulphonate was extracted with boiling 90% alcohol (275 cc.) and crystallised in clusters of orange needles.

Example XXXII

Potassium permanganate (15 g.) was dissolved in a solution of 4-methylphenoxymethane sodium sulphonate (10 g.) in water (200 cc.) and the reaction mixture heated at 75–80° C. for 2 hours. It was then filtered, made just acid to litmus, treated with barium chloride dihydrate (5 g.) and filtered hot. The filtrate was concentrated to half its bulk and made acid to Congo red with hydrochloric acid. Barium 4-carboxyphenoxymethane sulphonate monohydrate separated in large hexagonal plates which were collected and air dried. This compound may also be obtained by the alkaline hydrolysis of sodium 4-carbethoxyphenoxymethane sulphonate.

Example XXXIII

A solution of sodium hydroxide (8 g.; 1 mol.) in 20 cc. water was added to molten β-naphthol (90 g.; 3 mols.) and the water removed by distillation. Iodomethane sodium sulphonate (50 g.) was stirred in and the reaction mixture heated at 180–190° C. for 1.5 hours. The product was powdered, extracted exhaustively with boiling acetone and then dissolved in hot water (25 cc.). Sodium β-naphthoxymethane sulphonate crystallised on cooling.

Example XXXIV

Chloromethane sodium sulphonate monohydrate (34.1 g.) and hydroquinone (11.0 g.) were ground together and the mixture heated at 160°. 50% w./v. caustic soda solution (16.0 cc.) was added and the temperature raised to and kept at 200–220° for six hours.

The reaction mixture was dissolved in boiling water (140 cc.) and the dark brown solution treated with charcoal and Hyflo Supercel and filtered. A solution of barium chloride dihydrate (24.4 g.) in boiling water (50 cc.) was added to the filtrate. The mixture was concentrated to about 150 cc. and allowed to crystallise. After cooling to 10° C. the solid was filtered off, washed successively with ice-cold water (25 cc.) and ice-cold 50% aqueous alcohol (25 cc.) and dried in the oven, giving barium phenylene-1:4-bis(oxymethane sulphonate) in 82% yield.

I claim:

1. A process of producing sulphonic acids and their salts which includes the step of reacting a salt of a halomethane sulphonic acid of the formula $X.CH_2SO_3H$ where X represents a halogen atom with a member of the class consisting of the metal salts of monohydric phenols at a temperature between 170° C. and 240° C.

2. A process of producing sulphonic acids and their salts which includes the step of reacting a salt of a halomethane sulphonic acid of the formula $X.CH_2SO_3H$ where X represents a halogen atom with an alkali metal salt of a monohydric phenol.

3. A process of producing sulphonic acids and their salts which includes the step of reacting a salt of a halomethane sulphonic acid, of the formula $X.CH_2SO_3H$ where X represents a halogen atom with an alkali metal salt of a monohydric phenol at a temperature between 170° C. and 240° C.

4. A process as claimed in claim 2, wherein the reaction is effected in the presence, as reaction medium, of free phenolic compound corresponding to the phenol employed.

5. A process as claimed in claim 2 wherein the reaction is effected in the presence of water.

6. A process for producing sulphonic acids and their salts which includes the step of reacting at a temperature between 170° C. and 240° C. a salt of a halo-methane sulphonic acid of the formula $X.CH_2SO_3H$ where X represents a halogen atom with a compound of the type $R(OM)_n$ where M represents an alkali metal ion, $n$ is an integer not greater than 2 and R represents a member of the class consisting of unsubstituted phenyl and naphthyl radicals and phenyl and napthyl radicals substituted solely by at least one of the substituents halogen, alkyl, alkoxy, nitro, amino, cyano, carbalkoxy and carboxy.

7. A member of the class consisting of sulphonic acids of the general formula $R(O.CH_2.SO_3H)_n$ and their salts where $n$ represents an integer not greater than 2, R represents a member of the class consisting of unsubstituted phenyl and naphthyl radicals and phenyl and naphthyl radicals substituted solely by at least one member of the class consisting of the substituents halogen, alkyl, alkoxy, nitro, amino, cyano, carbalkoxy and carboxy.

8. A phenoxymethane monosulphonic acid of the general formula $R.O.CH_2SO_3H$ in which R is a phenyl radical substituted solely by at least one halogen atom.

9. A phenoxymethane monosulphonic acid of the general formula $R.O.CH_2SO_3H$ in which R is a phenyl radical substituted solely by at least one halogen atom and at least one alkyl group.

References Cited in the file of this patent

UNITED STATES PATENTS

| Number | Name | Date |
|---|---|---|
| 1,948,667 | Kraenzlein et al. | Feb. 27, 1934 |
| 2,110,847 | De Groote | Mar. 8, 1938 |
| 2,167,325 | Steindorff et al. | July 25, 1939 |
| 2,535,678 | Hollander et al. | Dec. 26, 1950 |

FOREIGN PATENTS

| Number | Country | Date |
|---|---|---|
| 258,473 | Germany | Apr. 4, 1913 |
| 798,728 | France | Mar. 11, 1936 |
| 647,214 | Great Britain | Dec. 6, 1950 |

OTHER REFERENCES

Richter's Org. Chemistry, 3rd edit., vol III (1946), p. 191.